United States Patent
Kageyama

(10) Patent No.: US 8,054,868 B2
(45) Date of Patent: Nov. 8, 2011

(54) UWB TRANSMITTING/RECEIVING APPARATUS, UWB TRANSMITTING/RECEIVING TERMINAL APPARATUS, AND UWB TRANSMITTING/RECEIVING SYSTEM

(75) Inventor: Takatoshi Kageyama, Yokohama (JP)

(73) Assignee: Panasonic Corporation, Osaka (JP)

( * ) Notice: Subject to any disclaimer, the term of this patent is extended or adjusted under 35 U.S.C. 154(b) by 604 days.

(21) Appl. No.: 12/096,895

(22) PCT Filed: Dec. 19, 2005

(86) PCT No.: PCT/JP2005/023273
§ 371 (c)(1),
(2), (4) Date: Jun. 10, 2008

(87) PCT Pub. No.: WO2007/072540
PCT Pub. Date: Jun. 28, 2007

(65) Prior Publication Data
US 2009/0268781 A1    Oct. 29, 2009

(51) Int. Cl.
*H04B 1/38* (2006.01)
(52) U.S. Cl. ........ 375/219; 375/220; 375/260; 375/299; 375/324; 375/349; 375/135; 375/136; 375/140; 375/141; 375/146; 375/147
(58) Field of Classification Search .............. 375/219, 375/220, 260, 299, 324, 349, 135, 136, 140, 375/141, 146, 147
See application file for complete search history.

(56) References Cited

U.S. PATENT DOCUMENTS

| 6,091,741 | A |   | 7/2000  | Fujiwara et al. |         |
|-----------|---|---|---------|-----------------|---------|
| 6,967,993 | B1| * | 11/2005 | Miller          | 375/150 |
| 2004/0176063 | A1 | * | 9/2004 | Choi          | 455/266 |
| 2005/0090274 | A1 | * | 4/2005 | Miyashita     | 455/502 |

FOREIGN PATENT DOCUMENTS

| JP | 07-123079 A  | 5/1995  |
| JP | 7-154297 A   | 6/1995  |
| JP | 9107393      | 4/1997  |
| JP | 9135248 A    | 5/1997  |
| JP | 2003-051761 A | 2/2003 |
| JP | 2003-169017 A | 6/2003 |
| JP | 2004-088180 A | 3/2004 |
| JP | 2004-336713 A | 11/2004 |
| JP | 2005-318470 A | 11/2005 |

OTHER PUBLICATIONS

JP Office Action for corresponding Japanese Application No. 2007-550945, dated Aug. 2, 2011, 3 pages.

* cited by examiner

*Primary Examiner* — Kabir A Timory
(74) *Attorney, Agent, or Firm* — Seed IP Law Group PLLC

(57) ABSTRACT

A UWB transmitting/receiving apparatus, a UWB transmitting/receiving terminal apparatus and a UWB transmitting/receiving system wherein a possibly reduced number of data retransmissions is achieved so as to raise the transmission efficiency. A UWB transmitting/receiving apparatus (100), which performs a UWB transmission, comprises a receiving part (400) that receives a propagation environment determination pulse transmitted from a UWB transmitting/receiving terminal apparatus (200), which also performs a UWB transmission, and a transmitting part (300) that transmits a data signal while the receiving part (400) is receiving the propagation environment determination pulse.

10 Claims, 10 Drawing Sheets

UWB TRANSMITTING/RECEIVING APPARATUS, UWB TRANSMITTING/RECEIVING TERMINAL APPARATUS, AND UWB TRANSMITTING/RECEIVING SYSTEM

TECHNICAL FIELD

The present invention relates to UWB (Ultra Wideband) transmitting/receiving apparatus, UWB transmitting/receiving terminal apparatus and UWB transmitting/receiving system that perform UWB transmission using millimeter waves and quasi-millimeter waves.

BACKGROUND ART

Recently, introduction of WPAN (Wireless Personal Area Network) that constructs small wireless networks between a plurality of electronic devices existing in the human environment and performs information communication, has been considered.

Especially, as a technique of realizing ultra high speed radio communication, UWB (ultra wideband) has attracted attention.

UWB is a communication technique utilizing an ultra wideband and, in the standardization of FCC (Federal Communications Commission), is defined as radio communication having a fractional bandwidth (10 dB) equal to or greater than 20 percent of the center frequency or having a bandwidth equal to or greater than 500 MHz. Further, in the United States, 3.1 to 10.6 GHz of microwave bands are allowed to be used in UWB.

UWB uses short pulse signals on the order of nanoseconds, and, consequently, has characteristics of enabling high resolution performance at short range and high accuracy measurement.

Patent Document 1 discloses a ultra wideband signal transmitting/receiving apparatus and a method for enabling high speed, high capacity communication using the UWB more efficiently.

The ultra wideband signal transmitting/receiving apparatus and method disclosed in Patent Document 1 differs from existing UWB transmitting/receiving apparatuses in realizing efficient data transmission according to a channel condition by applying channel information acquired from a received signal to a transmitting section and changing a data transmission method according to the channel information in the transmitting section.

The ultra wideband signal transmitting/receiving apparatus disclosed in Patent Document 1 includes a receiving section that acquires channel information that allows UWB channel condition prediction using a UWB pulse signal received through a UWB channel, changes a data transmission method according to the acquired channel information and enables efficient data transmission according to the UWB channel condition, and can transmit and receive data efficiently by changing the data transmission method according to the UWB channel condition.

FIG. 11 illustrates a schematic view explaining general data transmission control operations between a UWB transmitting/receiving apparatus and a UWB transmitting/receiving terminal apparatus using ACK and NACK after data transmission in conventional UWB transmitting/receiving system.

As shown in FIG. 11, in this UWB transmitting/receiving system, first, the UWB transmitting/receiving terminal apparatus transmits a data request signal (step ST1101).

The UWB transmitting/receiving apparatus receives the data request signal from the UWB transmitting/receiving terminal apparatus and thereupon returns ACK (step ST1102).

After transmitting ACK, the UWB transmitting/receiving apparatus transmits data to the UWB transmitting/receiving terminal apparatus after predetermined time (step ST1103).

Here, when the propagation environment deteriorated after the UWB transmitting/receiving apparatus transmitted the data, the UWB transmitting/receiving terminal apparatus cannot receive the data correctly.

Therefore, in the conventional UWB transmitting/receiving system, when the propagation environment deteriorates and the UWB transmitting/receiving terminal apparatus failed to receive the data correctly, the UWB transmitting/receiving terminal apparatus returns NACK (step ST1104).

After receiving NACK returned from the UWB transmitting/receiving terminal apparatus, the UWB transmitting/receiving apparatus retransmits the data (step ST1105) and receives ACK from the UWB transmitting/receiving terminal apparatus so that data transmission is completed (step ST1106).

Patent Document 1: Japanese Patent Application Laid-Open No. 2004-336713

DISCLOSURE OF INVENTION

Problems to be Solved by the Invention

By the way, the ultra wideband signal transmitting/receiving apparatus disclosed in Patent Document 1 predicts the channel condition upon next transmission based on a channel condition acquired from a received signal and selects a more efficient transmission method.

However, when the ultra wideband signal transmitting/receiving apparatus is applied to frequency bands with extremely strong propagation force such as millimeter waves and quasi-millimeter waves, the propagation environment significantly changes due to slight obstacles in the middle of the channel and antenna direction.

Consequently, if the ultra wideband signal transmitting/receiving apparatus knows the propagation environment from already received data, in a state that varies every moment, the ultra wideband signal transmitting/receiving apparatus cannot reliably transmit data efficiently.

That is, to transmit data efficiently in the ultra wideband signal transmitting/receiving apparatus, the propagation environment needs to be monitored at all times.

Thus, when this type of UWB transmitting/receiving apparatus performs UWB transmission using millimeter waves or quasi-millimeter waves, if there are obstacles on the channel, the channel is blocked because the rectilinear property of radio waves is significant and radio wave rotatory is small. Consequently, the UWB transmitting/receiving apparatus cannot receive data correctly.

Further, this type of UWB transmitting/receiving apparatus has great directional characteristics, and, consequently, received power drops if the direction of antennas is displaced.

Further, as shown in FIG. 11, when a conventional UWB transmitting/receiving apparatus cannot receive data due to the above-noted influence, the conventional UWB transmitting/receiving apparatus tries to retransmit the data.

However, if the UWB transmitting/receiving apparatus retransmits the data, transmission efficiency deteriorates.

It is therefore an object of the present invention to provide a UWB transmitting/receiving apparatus, UWB transmitting/receiving terminal apparatus and UWB transmitting/receiving system that reduce the number of data retransmissions as much as possible and improves transmission efficiency.

Means for Solving the Problem

The UWB transmitting/receiving apparatus of the present invention employs a configuration having: a receiving section that receives a propagation environment measurement pulse for measuring a propagation environment transmitted from an ultra wideband transmitting/receiving terminal apparatus that performs the ultra wideband transmission; and a transmitting section that transmits a data signal while the receiving section receives the propagation environment measurement pulse.

ADVANTAGEOUS EFFECT OF THE INVENTION

According to the present invention, by transmitting propagation environment measurement pulses from a UWB transmitting/receiving terminal apparatus to a UWB transmitting/receiving apparatus, the UWB transmitting/receiving apparatus can measure the propagation environment, so that it is possible to reduce the number of data retransmissions and improve transmission efficiency.

BEST MODE FOR CARRYING OUT THE INVENTION

Figure 1:
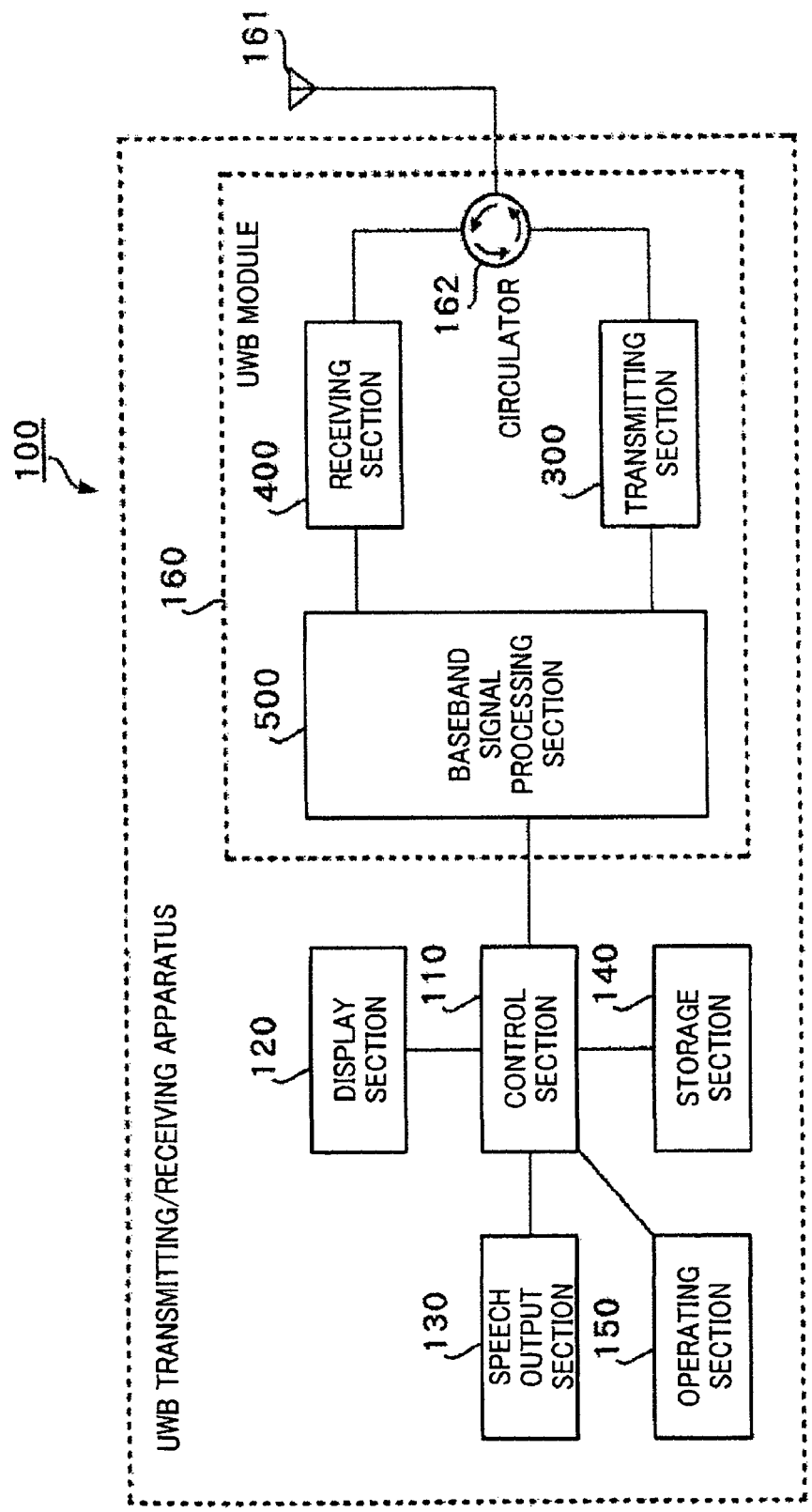
FIG. 1 is a block diagram showing a configuration of a UWB transmitting/receiving apparatus to be used in the UWB transmitting/receiving system according to the embodiment of the present invention.

An embodiment of the present invention will be explained below in detail with reference to the accompanying drawings. Further, in the drawings, components or corresponding parts having the same configurations or functions will be assigned the same reference numerals and detailed explanations thereof will not be repeated.

Embodiment

First, the configurations of a UWB transmitting/receiving apparatus and the UWB transmitting/receiving terminal apparatus to be used in the UWB transmitting/receiving system according to the embodiment of the present invention, will be explained below.

FIG. 1 is a block diagram showing the configuration of a UWB transmitting/receiving apparatus to be used in the UWB transmitting/receiving system according to the embodiment of the present invention.

Here, the UWB transmitting/receiving apparatus in the UWB transmitting/receiving system of the present embodiment is a transmitting/receiving apparatus for a large quantity of data such as TV and a HDD recorder, and access points that transmit a large quantity of data via the Internet.

As shown in FIG. 1, UWB transmitting/receiving apparatus 100 to be used in the UWB transmitting/receiving system of the present embodiment is formed with control section 100, display section 120, speech output section 130, storage section 140, operating section 150 and UWB module 160.

In FIG. 1, control section 110 controls data, display section 120 displays data, speech output section 130 outputs speech, storage section 140 stores data, and operating section 150 sends commands operated by the user to control section 110.

UWB module 160 is formed with antenna 161, circulator 162, transmitting section 300, receiving section 400 and baseband signal processing section 500.

Antenna 161 inputs and outputs UWB signals. Circulator 162 allows UWB signals to pass only in a specific direction and does not allow UWB signals to pass in the opposite direction.

Here, although UWB module 160 of the present embodiment inputs and outputs UWB signals by antenna 161 for transmission/reception using circulator 162, USB module 160 can transmit and receive UWB signals using different antennas without circulator 162.

Further, although UWB module 160 shown in FIG. 1 uses one antenna 161, UWB module 160 can use an antenna formed with a plurality of antenna elements such as an array antenna.

Further, although UWB transmitting/receiving apparatus 100 shown in FIG. 1 employs the same configuration as UWB communication terminal apparatus 200 described later and shown in FIG. 2, UWB transmitting/receiving apparatus 100 according to the present embodiment may employ a configuration removing display section 120, speech output section 130 and operating section 150 from UWB transmitting/receiving apparatus 100.

That is, when UWB transmitting/receiving apparatus 100 of the present embodiment is assumed to be, for example, home electric appliance, the configuration thereof is as shown in FIG. 1, and, when UWB transmitting/receiving apparatus 100 is assumed to be, for example, an access point, the configuration thereof may not include display section 120, speech output section 130 and operating section 150.

Further, when UWB transmitting/receiving apparatus 100 is assumed to be, for example, an access point, data stored in storage section 140 is also inputted to UWB transmitting/receiving apparatus 100 via the Internet.

Next, the configurations of the UWB transmitting/receiving apparatus and the UWB transmitting/receiving terminal apparatus to be used in the UWB transmitting/receiving system according to the embodiment of the present invention, will be explained.

An UWB transmitting/receiving terminal apparatus in the UWB transmitting/receiving system of the present embodiment is assumed to be, for example, a mobile telephone device, laptop computer and PDA (Personal Digital Assistance) that can transmit and receive data in UWB.

Figure 2:
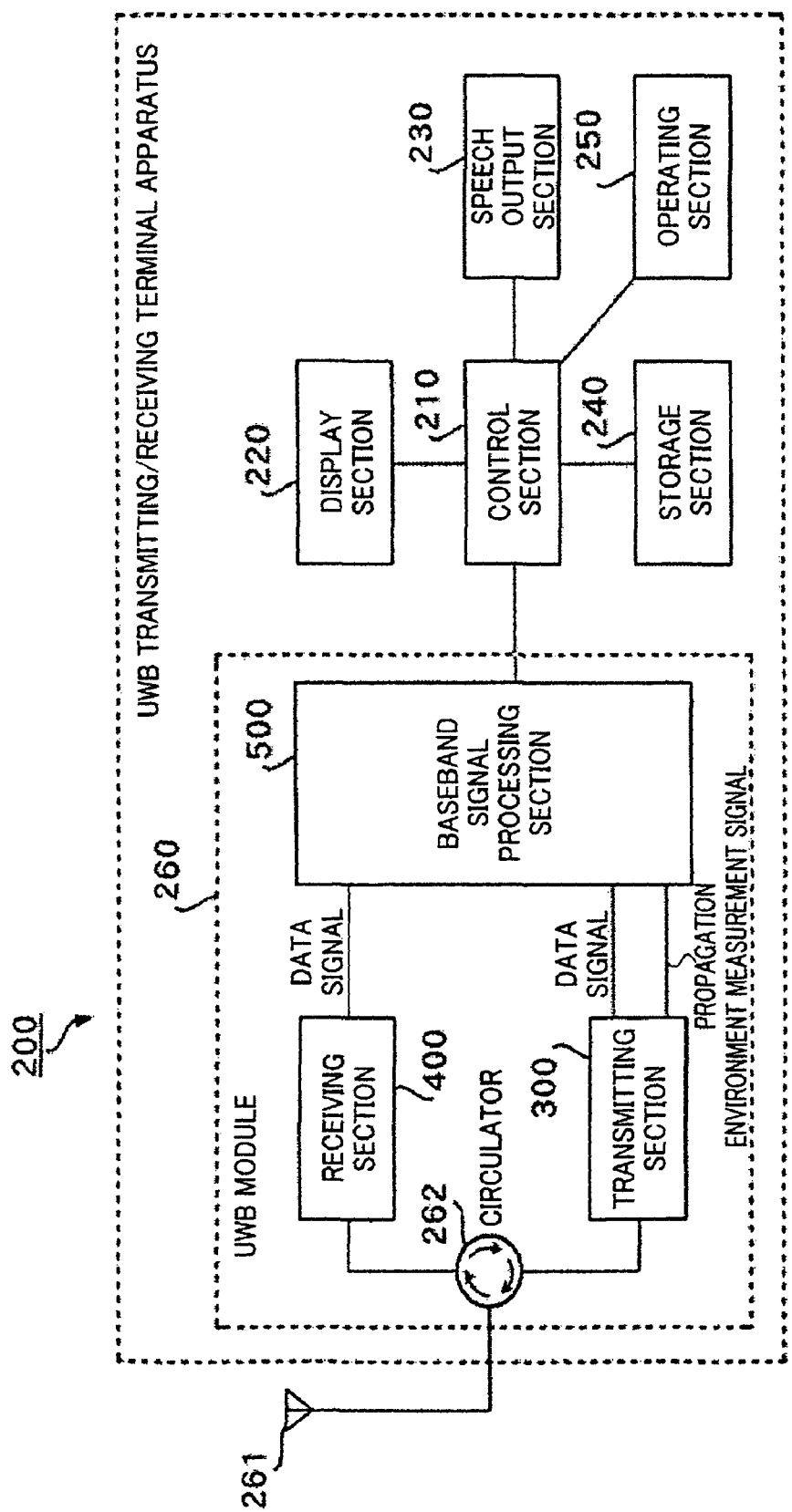
FIG. 2 is a block diagram showing a configuration of a UWB transmitting/receiving terminal apparatus to be used in the UWB transmitting/receiving system according to the embodiment of the present invention.

FIG. 2 is a block diagram showing a UWB transmitting/receiving terminal apparatus to be used in the UWB transmitting/receiving system according to the embodiment of the present invention.

As shown in FIG. 2, UWB transmitting/receiving terminal apparatus 200 to be used in the UWB transmitting/receiving system of the present embodiment is formed with control section 210, display section 220, speech output section 230, storage section 240, operating section 250 and UWB module 260.

In FIG. 2, control section 210 controls data, display section 220 displays data, speech output section 230 outputs speech, storage section 240 stores data, and operating section 250 sends commands operated by the user to control section 210.

UWB module 260 is formed with antenna 261, circulator 262, transmitting section 300, receiving section 400 and baseband signal processing section 500.

Antenna 261 inputs and outputs UWB signals. Circulator 262 allows UWB signals to pass in a specific direction and does not allow UWB signals to pass in the opposite direction.

Here, although UWB module 260 of the present embodiment inputs and outputs UWB signals by antenna 261 for transmission/reception using circulator 262, USB module 260 can transmit and receive UWB signals using different antennas without circulator 262.

Further, although UWB module 260 shown in FIG. 2 uses one antenna 261, UWB module 260 can use an antenna formed with a plurality of antenna elements such as an array antenna.

Next, the configurations of transmitting section 300 in UWB transmitting/receiving apparatus 100 and UWB transmitting/receiving terminal apparatus 200 to be used in the UWB transmitting/receiving system of the present embodiment.

Here, transmitting section 300 in UWB transmitting/receiving apparatus 100 and transmitting section 300 in UWB transmitting/receiving terminal apparatus 200 have the same configuration. As an example, UWB transmitting/receiving terminal apparatus 200 will be explained below.

Figure 3:
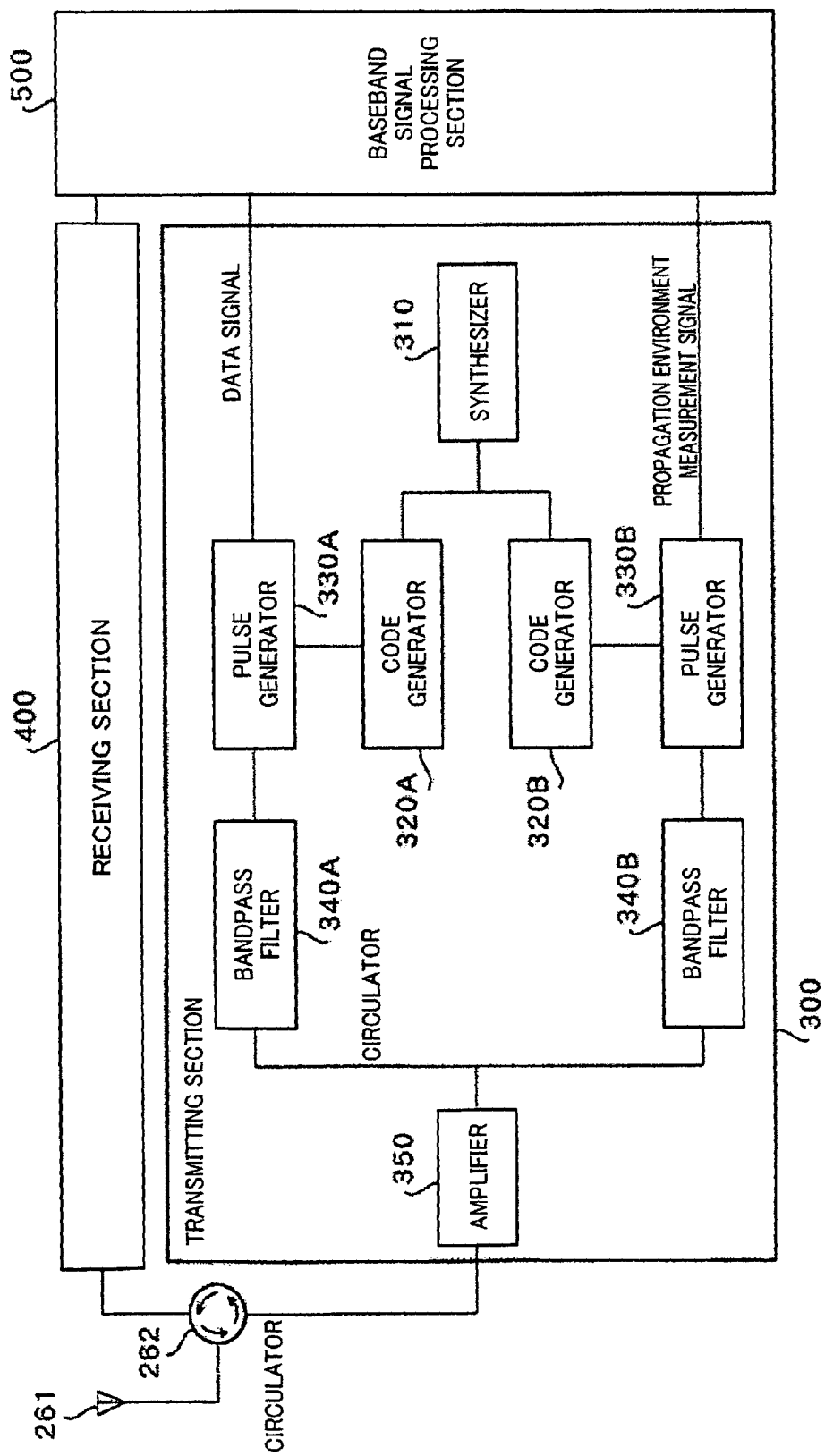
FIG. 3 is a block diagram showing a configuration of a transmitting section of a UWB transmitting/receiving terminal apparatus to be used in the UWB transmitting/receiving system according to the embodiment of the present invention.

FIG. 3 is a block diagram showing the configuration of the transmitting section in UWB transmitting/receiving terminal apparatus to be used in the UWB transmitting/receiving system of the present embodiment.

As shown in FIG. 3, transmitting section 300 is formed with synthesizer 310, code generators 320A and 320B, pulse generators 330A and 330B, bandpass filters 340A and 340B and amplifier 350.

In FIG. 3, synthesizer 310 generates the reference clock and code generators 320A and 320B generate unique codes.

Pulse generators 330A and 330B generate pulses at timings based on the codes from code generators 320A and 320B and modulate the pulses based on the data, respectively.

Bandpass filters 340A and 340B remove the unwanted components from the data pulse signals from pulse generators 330A and 330B, respectively.

Amplifier 350 amplifies the data pulse signals from which the unwanted components are removed, in bandpass filters 340A and 340B, to predetermined power.

Next, transmission operations of transmitting section 300 will be explained below. Here, although a case will be explained where pulse position modulation (PPM) is employed for the modulation scheme, the modulation scheme may be other modulation schemes than PPM.

In FIG. 3, code generator 320A generates a code unique to the user and inputs the generated code to pulse generator 330A.

Pulse generator 330A receives as input the code from code generator 320A and generates a pulse in a pulse position based on the code.

Pulse generator 330A receives as input a data signal from baseband signal processing section 500 and then modulates that pulse generated in a pulse position based on the code inputted from code generator 320A.

Further, in transmitting section 300, in the same way as the data signal, pulse position modulation based on the code generated in code generator 320 B is performed for a propagation environment measurement pulse inputted from baseband signal processing section 500.

Here, although code generators 320A and 320B generate codes at synchronized timing according to the clock from synthesizer 310, the generated codes differ from each other.

Accordingly, in this transmitting section 300, pulses are transmitted at respective timings, and, consequently, by multiplying codes by the pulse upon reception, it is possible to decide whether the received pulse is the data signal or the propagation environment measurement pulse.

The data signal after bandpass filter 340A and propagation environment measurement pulse after bandpass filter 340B are multiplexed by an adder (not shown) and outputted from antenna 261 through amplifier 350.

Next, the configurations of receiving section 400 and baseband signal processing section 500 in UWB transmitting/receiving apparatus 100 and UWB transmitting/receiving terminal apparatus 200 to be used in the UWB transmitting/receiving system of the present embodiment, will be explained.

Here, receiving section 400 and baseband signal processing section 500 in UWB transmitting/receiving apparatus 100 and receiving section 400 and baseband signal processing section 500 in UWB transmitting/receiving terminal apparatus 200 have the same configuration. As an example, UWB transmitting/receiving apparatus 100 will be explained below.

Figure 4:
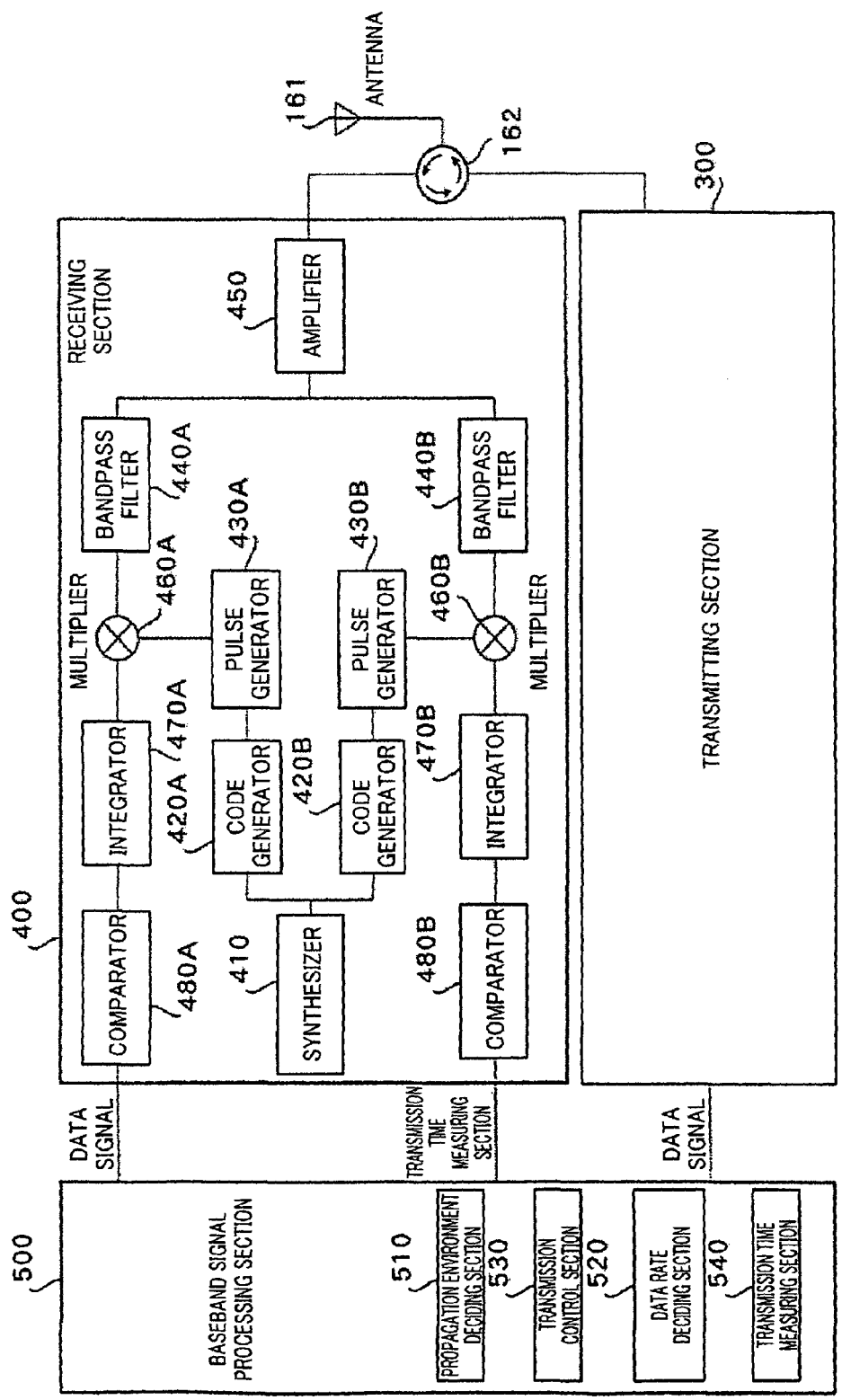
FIG. 4 is a block diagram showing a configuration of a receiving section and baseband signal processing section of a UWB transmitting/receiving apparatus to be used in the UWB transmitting/receiving system according to the embodiment of the present invention.

FIG. 4 is a block diagram showing the configuration of the receiving section and baseband signal processing section in UWB transmitting/receiving apparatus to be used in the UWB transmitting/receiving system according to the embodiment of the present invention.

As shown in FIG. 4, receiving section 400 includes synthesizer 410, code generators 420A and 420B, pulse generators 430A and 430B, bandpass filters 440A and 440B and amplifier 450.

Further, receiving section 400 includes multipliers 460A and 460B, integrators 470A and 470B, and comparators 480A and 480B.

In FIG. 4, amplifier 450 amplifies a signal received at antenna 161 to predetermined power. Bandpass filters 440A and 440B remove unwanted components from the received signal amplified in amplifier 450.

Synthesizer 410 generates the reference clock. Code generators 420A and 420B generate the same code used in UWB transmitting/receiving terminal apparatus 200 of the communicating apparatus.

Pulse generators 430A and 430B generate pulses according to the signals inputted from code generators 420A and 420B, respectively.

Multipliers 460A and 460B multiplex the data signal and the propagation environment measurement signal (propagation environment measurement pulse) by the codes generated in code generators 420A and 420B, respectively.

Integrators 470A and 470B integrate the outputs of multipliers 460A and 460B, respectively. Comparators 480A and 480B decide between the values "1" and "0" with the signals integrated in integrators 470A and 470B.

On the other hand, baseband signal processing section 500 is formed with propagation environment deciding section 510, data rate deciding section 520, transmission control section 530 and transmission time measuring section 540.

Propagation environment deciding section 510 decides the propagation environment by comparing the signal intensity of the propagation environment measurement pulse to a threshold set in advance and calculated in an experiment. Here, propagation environment deciding section 510 may decide the propagation environment from whether or not there is a propagation environment measurement pulse.

Data rate deciding section 520 decides the data rate for transmission data based on the processing in propagation environment deciding section 510.

Transmission control section 530 controls data transmission, intermittence and retransmission accompanying the processing in propagation environment deciding section 510.

Transmission time measuring section 540 calculates the transmission time between the time data is transmitted and the time the communicating party receives the data.

Next, reception steps in receiving section 400 will be explained.

In FIG. 4, a signal received at antenna 161 is inputted to multipliers 460A and 460B through amplifier 450 and bandpass filters 440A and 440B.

Multiplier 460A finds correlation by multiplying a generated pulse by the same code upon transmitting the data signal explained in FIG. 3. By this means, receiving section 400 receives the data signal through integrator 470A and comparator 480A.

Further, multiplier 460B finds correlation by multiplying a generated pulse by the same code upon generating the propagation environment measurement pulse explained in FIG. 3. By this means, receiving section 400 receives the propagation environment measurement signal (synchronized signal) through integrator 470B and comparator 480B.

Thus, receiving section 400 can easily extract two signals of a data signal and a propagation environment measurement signal by making an orthogonal combination of two codes generated in code generators 420A and 420B.

Next, data transmission control operations in the UWB transmitting/receiving system of the present embodiment will be explained.

UWB transmitting/receiving terminal apparatus 200 in the UWB transmitting/receiving system of the present embodiment transmits a propagation environment measurement pulse to UWB transmitting/receiving apparatus 100.

In the UWB transmitting/receiving system of the present embodiment, when the above-noted propagation environment measurement pulse is inputted in receiving section 400 in UWB transmitting/receiving apparatus 100 and the above-noted propagation environment measurement signal is inputted in baseband signal processing section 500 in UWB transmitting/receiving apparatus 100, propagation environment deciding section 510 in baseband signal processing section 500 shown in FIG. 4 decides whether to perform data transmission sufficiently.

The result is sent to data rate deciding section 520 in baseband signal processing section 500, so that a high data rate is set when a propagation environment is good and a low data rate is set when a propagation environment deteriorates. Here, whether or not the propagation environment is good is decided in propagation environment deciding section 510 according to whether or not deterioration of the data signal upon data transmission is greater than a predetermined threshold set in advance.

Here, when the propagation environment measurement signal is not inputted, transmission control section 530 in baseband signal processing section 500 decides that transmission is not possible and stops data transmission.

As described above, with the UWB transmitting/receiving system of the present embodiment, by performing data transmission while UWB transmitting/receiving apparatus 100 receives the propagation environment measurement pulse transmitted from UWB transmitting/receiving terminal apparatus 200, it is possible to respond to rapid changes in the propagation environment, and, consequently, realize efficient data transmission.

Next, data transmission control operations in the UWB transmitting/receiving system of the present embodiment will be explained. As a data transmission control operation in the UWB transmitting/receiving system of the present embodiment, a case where ACK and NACK are not used after data transmission and a case where ACK and NACK are used after data transmission are possible.

First, the data transmission control operations of the UWB transmitting/receiving system of the present embodiment, in a case where ACK and NACK are not used after data transmission, that is, in a case where whether or not data transmission is performed is decided from the reception state of a propagation environment measurement pulse, will be explained.

Figure 5:
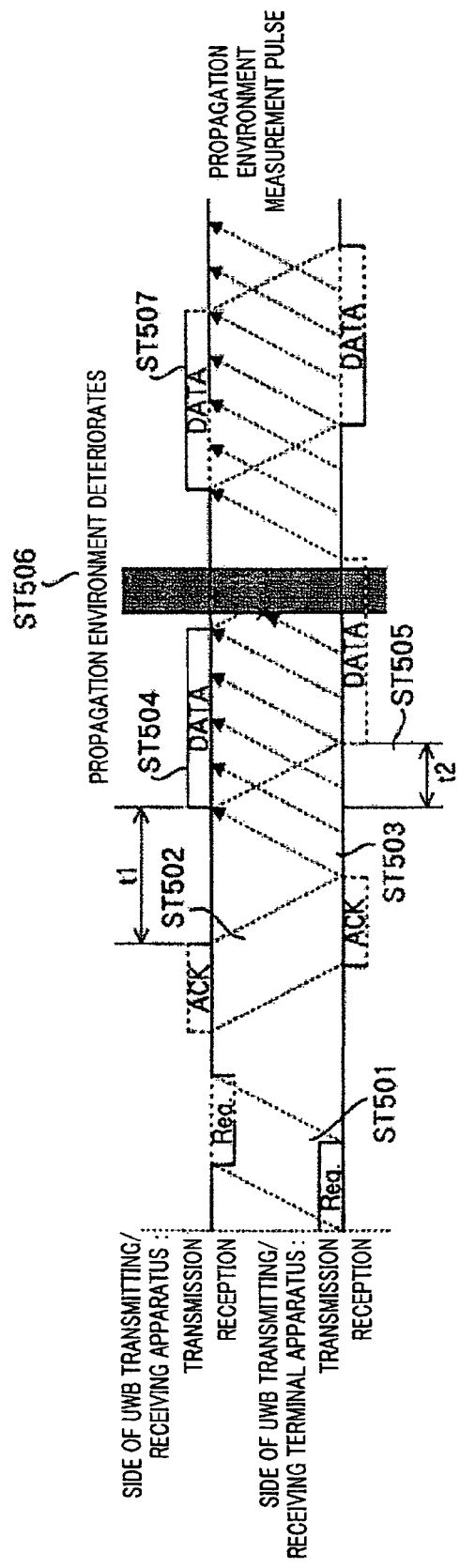
FIG. 5 illustrates a schematic view explaining data transmission control operations not using ACK and NACK after data transmission between a UWB transmitting/receiving apparatus and a UWB transmitting/receiving terminal apparatus in the UWB transmitting/receiving system according to the embodiment of the present invention.

FIG. 5 illustrates a schematic view explaining data transmission control operations not using ACK and NACK after data transmission between a UWB transmitting/receiving apparatus and a UWB transmitting/receiving terminal apparatus in the UWB transmitting/receiving system according to the embodiment of the present invention.

As shown in FIG. 5, in the UWB transmitting/receiving system of the present embodiment, first, UWB transmitting/receiving terminal apparatus 200 transmits a data request signal (step ST501).

UWB transmitting/receiving apparatus 100 receives the data request signal from UWB transmitting/receiving terminal apparatus 200 and thereupon returns ACK (step ST 502).

UWB transmitting/receiving terminal apparatus 200 finishes receiving the ACK returned from UWB transmitting/receiving apparatus 100 and, at the same time, transmits a propagation environment measurement pulse (step ST503).

UWB transmitting/receiving apparatus 100 receives the propagation environment measurement pulse and thereupon starts data transmission (step ST504).

Further, UWB transmitting/receiving apparatus 100 measures required transmission time t1 between the time ACK is transmitted and the time the propagation environment measurement pulse is received from UWB transmitting/receiving terminal apparatus 200, and estimates time t2 required to transmit data to UWB transmitting/receiving terminal apparatus 200 (step ST505).

Further, as shown in FIG. 5, when UWB transmitting/receiving apparatus 100 cannot receive the propagation environment measurement pulse from UWB transmitting/receiving terminal apparatus 200 after data transmission, UWB transmitting/receiving apparatus 100 decides that the propagation environment deteriorated and UWB transmitting/receiving terminal apparatus 200 failed to receive the data correctly (step ST506).

After that, when UWB transmitting/receiving apparatus 100 receives the propagation environment measurement pulse transmitted from UWB transmitting/receiving terminal apparatus 200, UWB transmitting/receiving apparatus 100 decides that the propagation environment has recovered and retransmits the above-mentioned data to UWB transmitting/receiving terminal apparatus 200 (step ST507).

In the UWB transmitting/receiving system of the present embodiment, by performing the above-described data transmission control, even if the propagation environment deteriorates rapidly, data can be transmitted immediately after the propagation environment has recovered, so that it is possible to realize efficient transmission.

Further, with the UWB transmitting/receiving system of the present embodiment, by performing control shown in above-noted step ST505 and estimating the time required to transmit data to UWB transmitting/receiving terminal apparatus 200, when the propagation environment deteriorated immediately after data transmission, it is possible to estimate whether or not the data has arrived at UWB transmitting/receiving terminal apparatus 200.

Here, UWB transmitting/receiving terminal apparatus 200 may report to UWB transmitting/receiving apparatus 100, which pattern code is used to transmit the propagation environment measurement pulse upon transmitting the data request signal, or designate the code when UWB transmitting/receiving apparatus 100 returns ACK to UWB transmitting/receiving terminal apparatus 200. Further, the side of UWB transmitting/receiving apparatus 100 may correlate the received signal to the code and specify the code for use upon generating the propagation environment measurement pulse.

Further, with the UWB transmitting/receiving system of the present embodiment, as described above, whether to receive data using the propagation environment measurement pulse can be decided, so that ACK needs not to be transmitted immediately after data is received.

Figure 11:
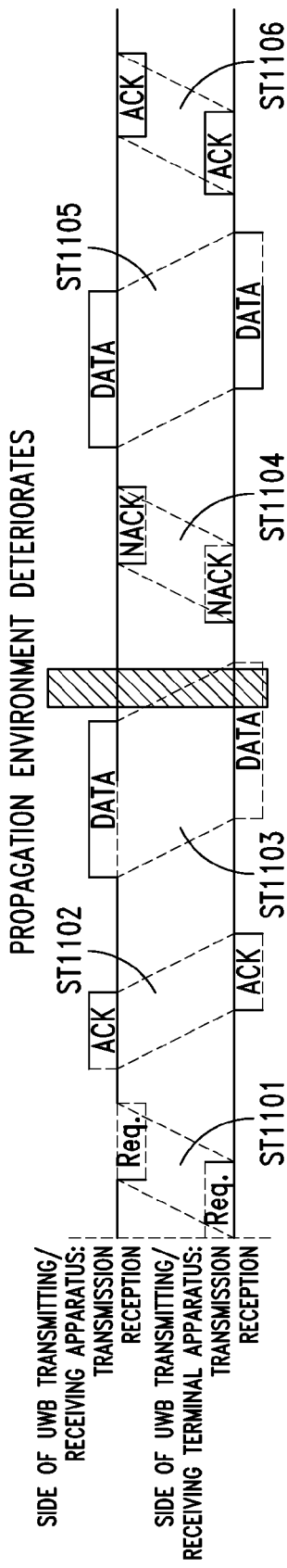
FIG. 11 illustrates a schematic view explaining general data transmission operations using ACK and NACK between a UWB transmitting/receiving apparatus and a UWB transmitting/receiving terminal apparatus after data transmission in conventional UWB transmitting/receiving system.

Consequently, the UWB transmitting/receiving system of the present embodiment can realize more efficient data transmission than a general conventional UWB transmitting/receiving system shown in FIG. 11 where UWB transmitting/receiving terminal apparatus returns NACK when the propagation environment deteriorated and the UWB transmitting/receiving terminal apparatus failed to receive data correctly.

Figure 6:
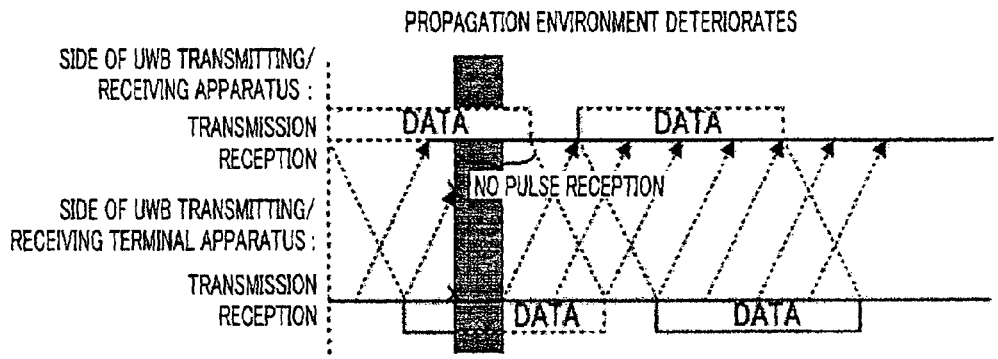
FIG. 6 illustrates a schematic view explaining data transmission control operations when a propagation environment deteriorates during data transmission between a UWB transmitting/receiving apparatus and a UWB transmitting/receiving terminal apparatus in the UWB transmitting/receiving system according to the embodiment of the present invention.

Further, in the UWB transmitting/receiving system of the present embodiment, as shown in FIG. 6, when the propagation environment deteriorated during data transmission from UWB transmitting/receiving apparatus 100, UWB transmitting/receiving apparatus 100 can know that the propagation environment deteriorated during data transmission, and, consequently, realize efficient data transmission.

Next, in the UWB transmitting/receiving system of the present embodiment, the operations in a case where required transmission time t1 between the time ACK is transmitted from UWB transmitting/receiving apparatus 100 and the time the propagation environment measurement pulse is received from UWB transmitting/receiving terminal apparatus 200 is calculated, will be explained.

Figure 7:
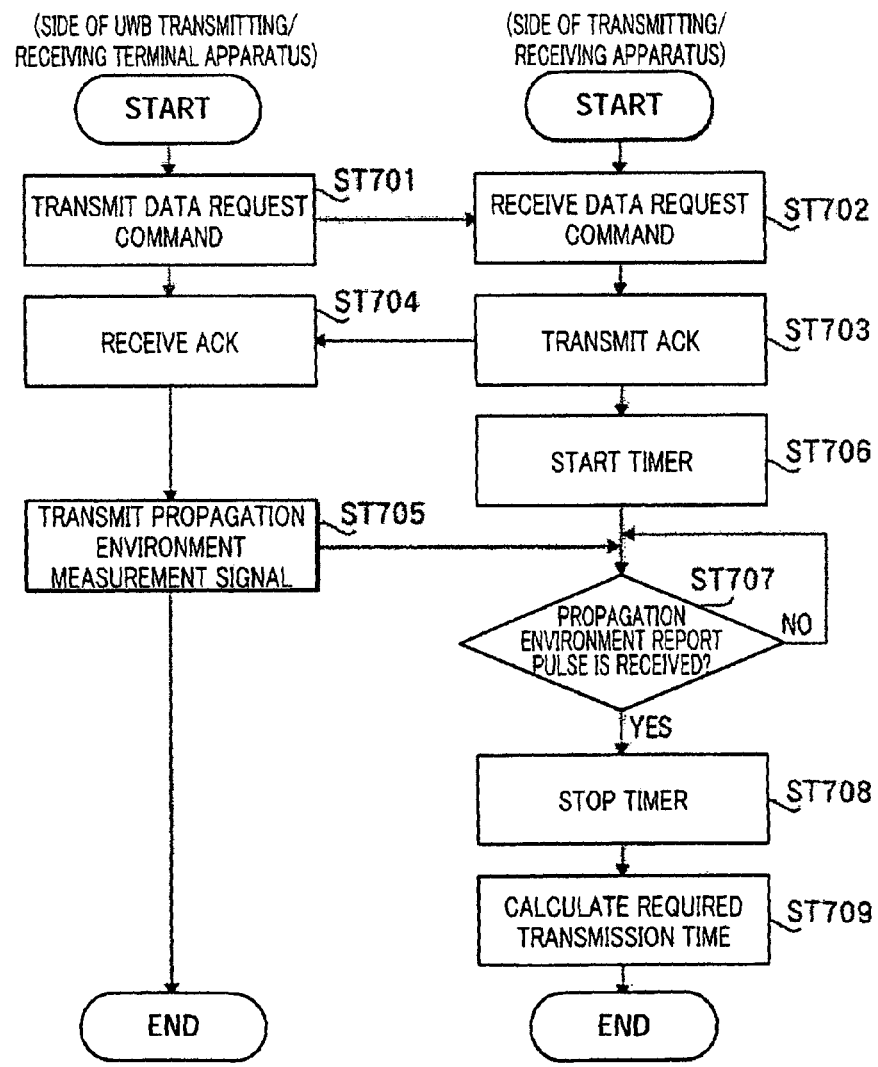
FIG. 7 is a flowchart showing control operations in a case of calculating the required transmission time it takes to transmit a signal from a UWB transmitting/receiving apparatus to a UWB transmitting/receiving terminal apparatus in the UWB transmitting/receiving system according to the embodiment of the present invention.

FIG. 7 is a flowchart showing control operations upon calculating the required transmission time to transmit a signal from the UWB transmitting/receiving apparatus to the UWB transmitting/receiving terminal apparatus in the UWB transmitting/receiving system according to the embodiment of the present invention.

In FIG. 7, when UWB transmitting/receiving apparatus 100 and UWB transmitting/receiving terminal apparatus 200 in the UWB transmitting/receiving system of the present embodiment start operating, first, UWB transmitting/receiving terminal apparatus 200 transmits a data request command (step ST701).

UWB transmitting/receiving apparatus 100 receives the data request command from UWB transmitting/receiving terminal apparatus 200 (step ST702) and thereupon transmits ACK to UWB transmitting/receiving terminal apparatus 200 (step ST703).

UWB transmitting/receiving terminal apparatus 200 receives the ACK transmitted from UWB transmitting/receiving apparatus 100 (step ST704) and thereupon transmits a propagation environment measurement signal to UWB transmitting/receiving apparatus 100 and then finishes the operation.

Here, when UWB transmitting/receiving terminal apparatus 200 transmits ACK, at the same time, UWB transmitting/receiving apparatus 100 starts a timer and starts measuring required transmission time t1 (step ST706).

Next, UWB transmitting/receiving apparatus 100 decides whether or not to receive the propagation environment measurement pulse transmitted from UWB transmitting/receiving terminal apparatus 200 (step ST707).

UWB transmitting/receiving apparatus 100 stops the timer upon receiving the propagation environment measurement pulse transmitted from UWB transmitting/receiving terminal apparatus 200 (step ST708) and calculates required transmission time t1 (step ST709), and finishes the operation.

Next, in the UWB transmitting/receiving system of the present embodiment, the operations in a case where a propagation environment deteriorates while UWB transmitting/receiving apparatus 100 transmits data, will be explained.

Figure 8:
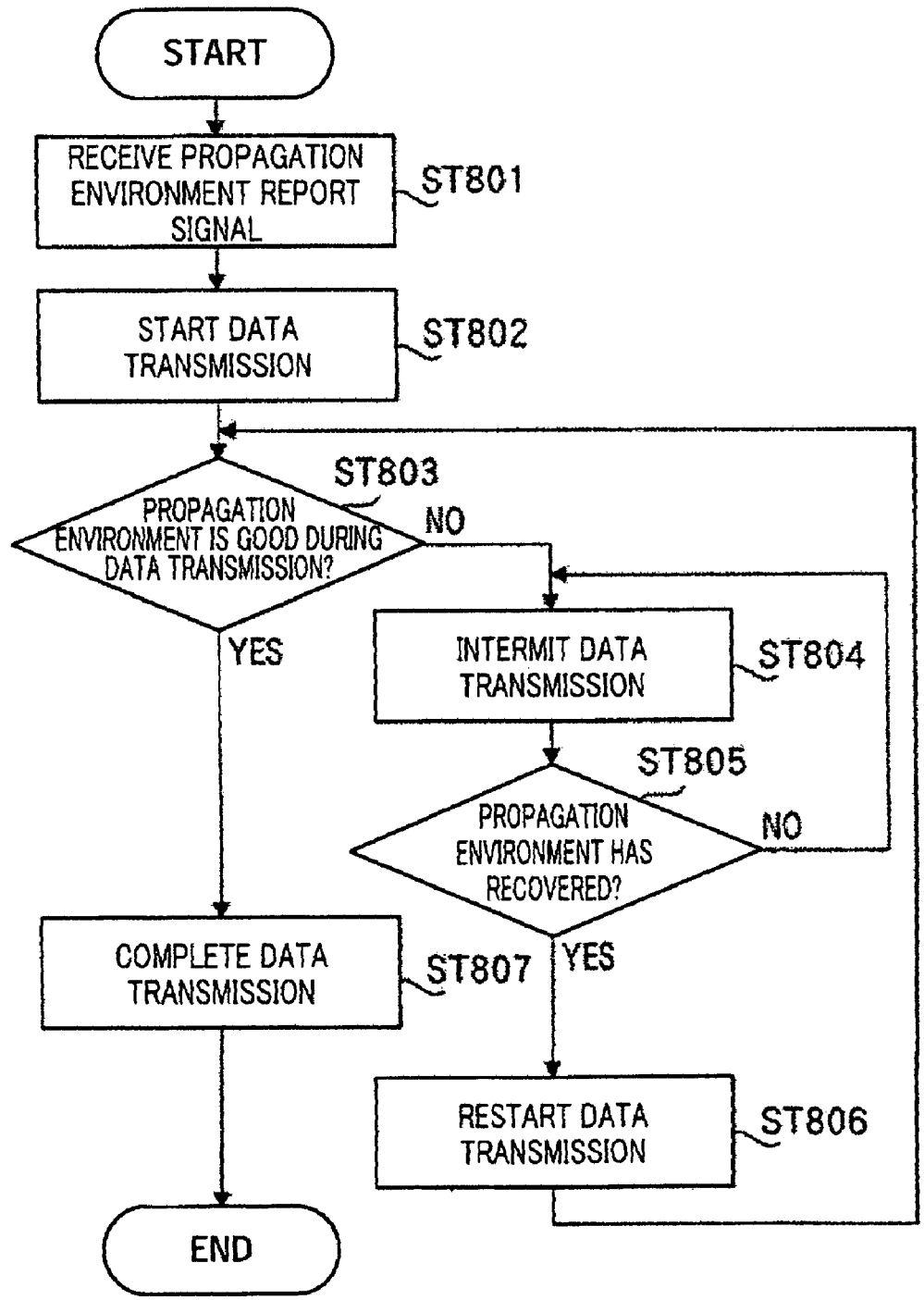
FIG. 8 is a flowchart showing control operations when a propagation environment deteriorates during data transmission in a UWB transmitting/receiving apparatus in the UWB transmitting/receiving system according to the embodiment of the present invention.

FIG. 8 is a flowchart showing the control operations in a case where a propagation environment deteriorates during data transmission from a UWB transmitting/receiving apparatus in the UWB transmitting/receiving system of the embodiment of the present invention.

In FIG. 8, when UWB transmitting/receiving apparatus 100 in the UWB transmitting/receiving system of the present embodiment starts operating, UWB transmitting/receiving apparatus 100 receives a propagation environment measurement pulse corresponding to a propagation environment report signal from UWB transmitting/receiving terminal apparatus 200 (step ST801) and starts data transmission (step ST802).

Next, UWB transmitting/receiving apparatus 100 decides whether or not the condition of the propagation environment during data transmission is good (step ST803).

When UWB transmitting/receiving apparatus 100 decides that the condition of the propagation environment during data transmission is not good in step ST803, UWB transmitting/receiving apparatus 100 intermits data transmission (step ST804) and decides whether or not the propagation environment has recovered (step ST805).

After that, in step ST805, when UWB transmitting/receiving apparatus 100 decides that the propagation environment has recovered, UWB transmitting/receiving apparatus 100 restarts data transmission (step ST806) and returns to step ST803 to monitor the propagation environment during data transmission.

In step ST803, when UWB transmitting/receiving apparatus 100 decides that the condition of the propagation environment during data transmission is good, UWB transmitting/receiving apparatus 100 completes data transmission (step ST807) and then finishes the operation.

Next, in the UWB transmitting/receiving system of the present embodiment, operations in a case where the propagation environment deteriorates immediately after UWB transmitting/receiving apparatus 100 transmits data, will be explained.

Figure 9:
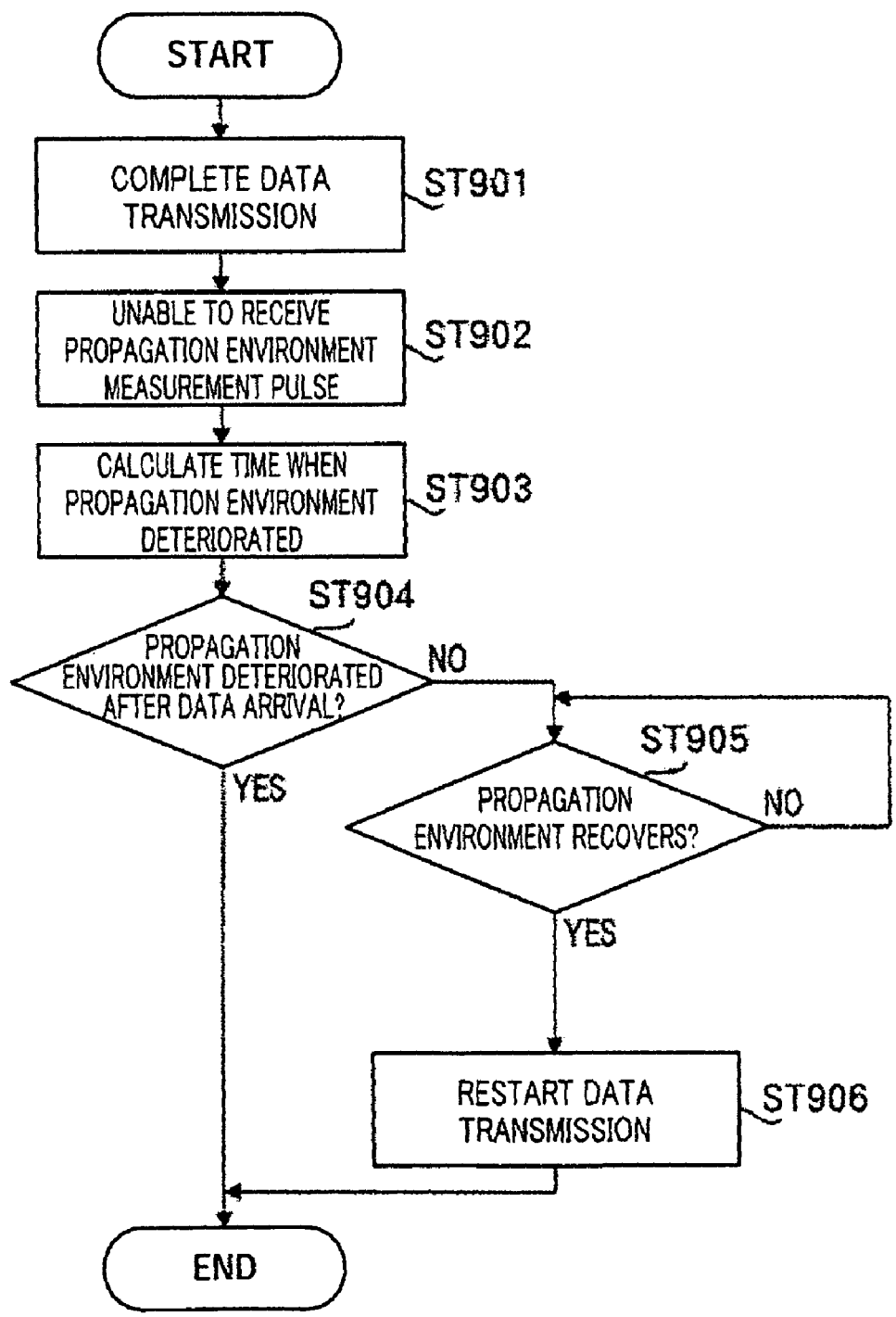
FIG. 9 is a flowchart showing control operations when a propagation environment deteriorates immediately after data transmission in a UWB transmitting/receiving apparatus in the UWB transmitting/receiving system according to the embodiment of the present invention.

FIG. 9 is a flowchart showing control operations in a case where the propagation environment deteriorates immediately after data transmission from the UWB transmitting/receiving apparatus in the UWB transmitting/receiving system according to the embodiment of the present invention.

In FIG. 9, when UWB transmitting/receiving apparatus 100 in the UWB system of the present embodiment starts operating, and, immediately after completion of data transmission (step ST901), is in a state where the propagation environment measurement pulse cannot be received (step ST902), UWB transmitting/receiving apparatus 100 calculates the time the propagation environment deteriorated (step ST903).

UWB transmitting/receiving apparatus 100 decides whether or not the propagation environment deteriorated after the transmission data arrived at UWB transmitting/receiving terminal apparatus 200 (step ST904).

In step ST904, if UWB transmitting/receiving apparatus 100 decides that the propagation environment has deteriorated after the transmission data arrived at UWB transmitting/receiving terminal apparatus 200, UWB transmitting/receiving apparatus 100 then finishes the operation.

By contrast, in step ST904, if UWB transmitting/receiving apparatus 100 decides that the propagation environment has deteriorated before the transmission data arrived at UWB transmitting/receiving terminal apparatus 200, UWB transmitting/receiving apparatus 100 decides whether or not the propagation environment has recovered (step ST905).

In step ST905, if UWB transmitting/receiving apparatus 100 decides that the propagation environment has recovered, UWB transmitting/receiving apparatus 100 restarts data transmission (step ST906) and then finishes the operation.

Next, among the data transmission control operations in the UWB transmitting/receiving system of the present embodiment, the data transmission control operations of UWB transmitting/receiving apparatus 100 and UWB transmitting/receiving terminal apparatus 200 in a case where ACK and NACK are used after data transmission, will be explained.

Figure 10:
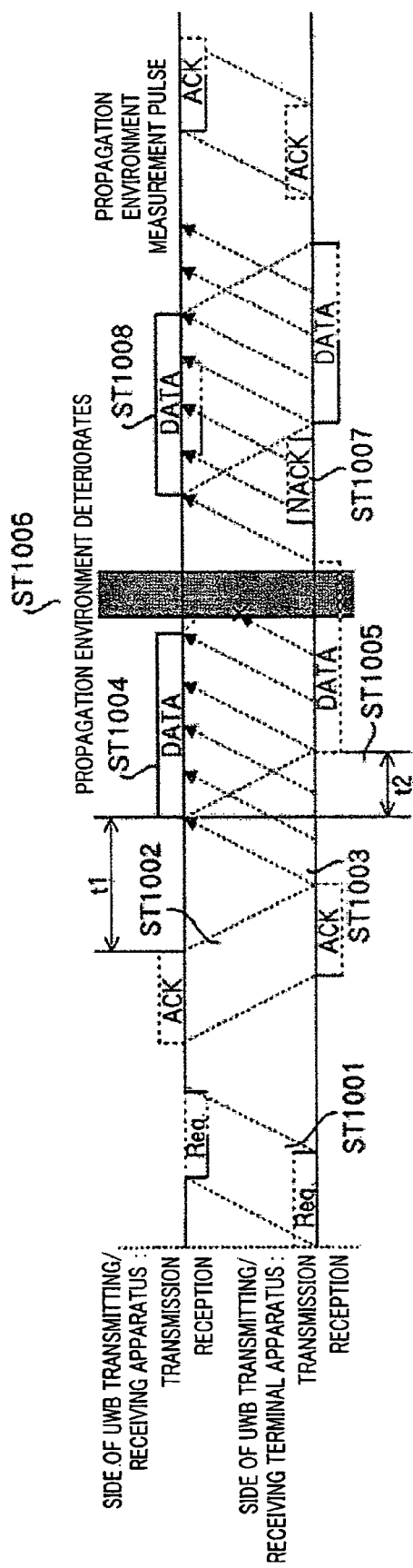
FIG. 10 illustrates a schematic view explaining data transmission control operations using ACK and NACK between a UWB transmitting/receiving apparatus and a UWB transmitting/receiving terminal apparatus after data transmission in the UWB transmitting/receiving system according to the embodiment of the present invention.

FIG. 10 illustrates a schematic view explaining the data transmission control operations of the UWB transmitting/receiving apparatus and the UWB transmitting/receiving terminal apparatus, in a case where ACK and NACK are used after data transmission in the UWB transmitting/receiving system according to the embodiment of the present invention.

As shown in FIG. 10, with the UWB transmitting/receiving system of the present embodiment, in the same way as in the UWB transmitting/receiving system shown in FIG. 5, UWB transmitting/receiving terminal apparatus 200 transmits a data request signal (step ST1001).

UWB transmitting/receiving apparatus 100 receives the data request signal from UWB transmitting/receiving terminal apparatus 200 and thereupon returns ACK (step ST1002).

UWB transmitting/receiving terminal apparatus 200 receives the ACK returned from UWB transmitting/receiving apparatus 100, and, at the same time, transmits a propagation environment measurement pulse (step ST1003).

UWB transmitting/receiving apparatus 100 receives the propagation environment measurement pulse and thereupon starts data transmission (step ST1004).

Further, UWB transmitting/receiving apparatus 100 measures required transmission time t1 between the time ACK is transmitted and the time the propagation environment measurement pulse is received from UWB transmitting/receiving terminal apparatus 200, and estimates time t2 required to transmit data to UWB transmitting/receiving terminal apparatus 200 (step ST1005).

Here, as shown in FIG. 10, a case is assumed where the propagation environment deteriorated and UWB transmitting/receiving terminal apparatus 200 failed to receive data from UWB transmitting/receiving apparatus 100 (step ST1006).

In this case, UWB transmitting/receiving terminal apparatus 200 returns NACK to UWB transmitting/receiving apparatus 100 to report that UWB transmitting/receiving terminal apparatus 200 failed to receive the data correctly (step ST1007).

On the other hand, when UWB transmitting/receiving apparatus 100 failed to receive the propagation environment measurement pulse from UWB transmitting/receiving terminal apparatus 200 after data transmission, UWB transmitting/receiving apparatus 100 decides that the propagation environment deteriorated and UWB transmitting/receiving terminal apparatus 200 could not correctly receive the data.

Upon receiving the propagation environment measurement pulse transmitted from UWB transmitting/receiving terminal apparatus 200, UWB transmitting/receiving apparatus 100 decides that the propagation environment has recovered and retransmits the above-mentioned data to UWB transmitting/receiving terminal apparatus 200 (step ST1008).

Thus, with the UWB transmitting/receiving system of the present embodiment, even in a case of normal data transmission where UWB transmitting/receiving terminal apparatus 200 returns ACK or NACK after receiving the data from UWB transmitting/receiving apparatus 100, UWB transmitting/receiving terminal apparatus 200 transmits a propagation environment measurement pulse to UWB transmitting/receiving apparatus 100.

By this means, with the UWB transmitting/receiving system of the present embodiment, even in a case where the propagation environment deteriorated and UWB transmitting/receiving terminal apparatus 200 failed to receive data, before UWB transmitting/receiving apparatus 100 receives NACK from UWB transmitting/receiving terminal apparatus 200, UWB transmitting/receiving apparatus 100 can know that UWB transmitting/receiving terminal apparatus 200 failed to receive the data correctly.

Consequently, with the UWB transmitting/receiving system of the present embodiment, without receiving NACK from UWB transmitting/receiving terminal apparatus 200 after the propagation environment deteriorated, at the time when UWB transmitting/receiving apparatus 100 receives a propagation environment measurement pulse from UWB transmitting/receiving terminal apparatus 200, UWB transmitting/receiving apparatus 100 can decide that the propagation environment has recovered and retransmit the data quickly and then complete the operation.

As described above, with the UWB transmitting/receiving system of the present embodiment, by transmitting a transmission environment measurement pulse from UWB transmitting/receiving terminal apparatus 200 to UWB transmitting/receiving apparatus 100, UWB transmitting/receiving apparatus 100 can measure a propagation environment, so that it is possible to reduce the number of retransmissions and improve transmission efficiency.

Further, with the UWB transmitting/receiving system of the present embodiment, UWB transmitting/receiving apparatus 100 can decide whether or not data transmission can be correctly performed based on the transmission environment measurement pulse from UWB transmitting/receiving terminal apparatus 200, so that it is possible to reduce the number of retransmissions and improve transmission efficiency.

Further, with the UWB transmitting/receiving system of the present embodiment, if data transmission from UWB transmitting/receiving apparatus 100 is blocked halfway, UWB transmitting/receiving apparatus 100 can stop data transmission and reduce power consumption.

Further, with the UWB transmission/reception of the present embodiment, if a propagation environment deteriorates during data transmission from UWB transmitting/receiving apparatus 100, data is transmitted with a lower transmission rate, it is possible to realize efficient data transmission.

Further, with the UWB transmitting/receiving system of the present embodiment, immediately after the propagation environment recovered, data transmission is restarted, so that it is possible to realize efficient data transmission.

Further, with the UWB transmitting/receiving system of the present embodiment, immediately after the propagation environment recovered, data is transmitted with a higher transmission rate, so that it is possible to realize efficient data transmission.

Further, with the UWB transmitting/receiving system of the present embodiment, by measuring the time between the time ACK is transmitted and the time a propagation environment measurement pulse is received, and calculating the required time between the time a signal is transmitted from UWB transmitting/receiving apparatus 100 and the time the signal arrives at UWB transmitting/receiving terminal apparatus 200 based on the measured time, so that it is possible to estimate the required time to transmit data.

Further, with the UWB transmitting/receiving system of the present embodiment, after completion of data transmission from UWB transmitting/receiving apparatus 100, when the signal intensity of the propagation environment measurement pulse from UWB transmitting/receiving terminal apparatus 200 is equal to or less than a threshold, the time data transmission is completed is compared to the required time the data arrives, and, when UWB transmitting/receiving terminal apparatus 200 does not decide that the data did not arrive, the data is retransmitted immediately after the signal intensity of the propagation environment measurement pulse is equal to or greater than the predetermined threshold, so that it is possible to realize efficient data transmission.

Further, with the UWB transmitting/receiving system of the present embodiment, by generating data signals and propagation environment measurement pulses using the pattern code unique thereto, it is possible to identify a data signal and transmission environment measurement pulse even if the data signal and the propagation environment measurement pulse are transmitted at the same time.

Further, with the UWB transmitting/receiving system of the present embodiment, by extracting a synchronized signal based on a propagation environment measurement pulse to be transmitted from UWB transmitting/receiving terminal apparatus 200, data in synchronization with this synchronized signal can be transmitted, so that it is possible to easily synchronize UWB transmitting/receiving apparatus 100 and UWB transmitting/receiving terminal apparatus 200.

Further, with the UWB transmitting/receiving system of the present embodiment, when a channel is blocked in a data reception period, by retransmitting the data before an acknowledgement signal representing failed data reception (NACK) is received, it is possible to realize efficient data transmission.

INDUSTRIAL APPLICABILITY

The UWB transmitting/receiving apparatus and UWB transmitting/receiving terminal apparatus of the present invention can reduce the number of data retransmissions and improve transmission efficiency, and, consequently, are useful as UWB transmitting/receiving apparatus, UWB transmitting/receiving terminal apparatus and UWB transmission/reception that performs UWB transmission using millimeter waves or quasi-millimeter waves.

The invention claimed is:

1. A transmitting and receiving apparatus comprising:
   a request processing section configured to receive, from a terminal apparatus,
      a request to transmit requested data, and to transmit acknowledgement signal to the terminal apparatus when the request is received;
   a transmitting section configured to transmit the requested data to the terminal apparatus;
   a receiving section configured to receive propagation environment measurement signals from the terminal apparatus, each of the propagation environment measurement signals being received at a different timing;
   a time measurement section configured to measure a first time period between transmission of the acknowledgement signal and an initial reception of the propagation environment measurement signals from the terminal apparatus, and to calculate, based on the measured first time period, a second time period required for a signal transmitted from the transmitting and receiving apparatus to reach the terminal apparatus;
   a deciding section configured to compare signal intensity of each of the received propagation environment measurement signals and a predetermined threshold; and
   a control section configured to control the transmitting section to (i) continue transmitting the requested data while the propagating environment measurement signals are received from the terminal apparatus, (ii) intermit the transmission of the requested data when the propagation environment measurement signals are not received from the terminal apparatus, and (iii)

when the deciding section makes a determination that the signal intensity of the propagation environment measurement signal is equal to or less than the predetermined threshold, measure a third time period between transmission of the requested data and the determination by the deciding section; compare the measured third time period to the second time period required for a signal transmitted from the transmitting and receiving apparatus to reach the terminal apparatus; and if a result of the comparison indicates that the requested data has not completely reached the terminal apparatus, retransmit the requested data to the terminal apparatus.

2. The transmitting and receiving apparatus according to claim 1, wherein the deciding section is further configured to determine a state of a propagation environment based on a result of the comparison.

3. The transmitting and receiving apparatus according to claim 2, wherein the control section is further configured to control the transmitting section to intermit the transmission of the requested data when the deciding section determines that the state of the propagation environment is deteriorated.

4. The transmitting and receiving apparatus according to claim 2, wherein the control section is further configured to control the transmitting section to transmit the requested data at a lower transmission rate when the deciding section determines that the state of the propagation environment is deteriorated.

5. The transmitting and receiving apparatus according to claim 1, wherein the control section is further configured to restart the transmission of the requested data, after having intermitted the transmission of the requested data, when the propagation environment measurement signal is received.

6. The transmitting and receiving apparatus according to claim 4, wherein the control section is further configured to control the transmission section to transmit the requested data at a higher transmission rate when the deciding section determines that the state of the propagation environment has recovered from the deteriorated state.

7. The transmitting and receiving apparatus according to claim 1, further comprising:
a first coding section configured to encode the requested data using a first code orthogonal to a second code, the second code being used to encode each of the propagation environment measurement signals, wherein,
the transmitting section is configured to transmit the encoded requested data, and
the receiving section is configured to receive the encoded propagation environment measurement signals.

8. A terminal apparatus comprising:
a transmitting section configured to transmit a request to a transmitting and receiving apparatus to transmit data; and
a receiving section configured to receive acknowledgement signal from the transmitting and receiving apparatus in response to the request, and to receive the requested data transmitted from the transmitting and receiving apparatus, wherein
the transmitting section is further configured to continuously transmit propagation environment measurement signals to the transmitting and receiving apparatus while the receiving section is receiving the requested data,
each of the propagation environment measurement signals is transmitted at a different timing, and
the receiving section is further configured to receive retransmitted requested data retransmitted from the transmitting and receiving apparatus, when the transmitting and receiving apparatus determines that the requested data has not completely reached the terminal apparatus based on comparing (a) a time period required for a signal transmitted from the transmitting and receiving apparatus to reach the terminal apparatus, which is calculated based on a time period between transmission of the acknowledgement signal and an initial reception of the propagation environment measurement signals at the transmitting and receiving apparatus, with (b) a time period between transmission of the requested data from the transmitting and receiving apparatus, and a determination, by the transmitting and receiving apparatus, of signal intensity of the propagation environment measurement signal being equal to or less than a predetermined threshold.

9. The terminal apparatus according to the claim 8, further comprising:
a second coding section configured to encode each of the propagation environment measurement signals using a second code orthogonal to a first code, the first code being used to encode the requested data, wherein
the receiving section is configured to receive the encoded requested data, and
the transmitting section is configured to transmit the encoded propagation environment measurement signals.

10. A transmitting and receiving system comprising:
a transmitting and receiving apparatus configured (i) to receive, from a terminal apparatus, a request to transmit requested data, (ii) to transmit acknowledgement signal to the terminal apparatus when the request is received, (iii) to transmit the requested data to the terminal apparatus, (iv) to receive from the terminal apparatus propagation environment measurement signals, each of the propagation environment measurement signals being received at a different timing, (v) to measure a first time period between transmission of the acknowledgement signal and an initial reception of the propagation environment measurement signals from the terminal apparatus, and (vi) to calculate, based on the measured first time period, a second time period required for a signal transmitted from the transmitting and receiving apparatus to reach the terminal apparatus;
a terminal apparatus configured (i) to transmit the request to transmit the requested data to the transmitting and receiving apparatus, (ii) to receive the requested data, and (iii) to transmit the propagation environment measurement signals; and
a control section configured to control the transmitting and receiving apparatus to (i) continue transmitting the requested data while the propagating environment measurement signals are received from the terminal apparatus, (ii) intermit the transmission of the requested data when the propagation environment measurement signals are not received from the terminal apparatus, and (iii) based on a determination that the signal intensity of the propagation environment measurement signal is equal to or less than a predetermined threshold, measure a third time period between transmission of the requested data and the determination; compare the measured third time period to the second time period required for a signal transmitted from the transmitting and receiving apparatus to reach the terminal apparatus; and if a result of the comparison indicates that the requested data has not completely reached the terminal apparatus, retransmit the requested data to the terminal apparatus.

* * * * *